United States Patent
Ooi Huat Lye et al.

(10) Patent No.: US 8,861,123 B1
(45) Date of Patent: Oct. 14, 2014

(54) DISK DRIVE SERVOING ON FIRST DISK SURFACE WHILE ERASING SECOND DISK SURFACE

(71) Applicant: Western Digital Technologies, Inc., Irvine, CA (US)

(72) Inventors: Edmund Ooi Huat Lye, Klang (MY); Chaisit Siricharoenchai, Huaykhwang (TH); Charles A. Park, Aromas, CA (US); Siri S. Weerasooriya, Campbell, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 63 days.

(21) Appl. No.: 13/650,008

(22) Filed: Oct. 11, 2012

Related U.S. Application Data (60) Provisional application No. 61/705,506, filed on Sep. 25, 2012.

(51) Int. Cl.
*G11B 5/02* (2006.01)

(52) U.S. Cl.
USPC .......................................... 360/57; 360/78.06

(58) Field of Classification Search
None
See application file for complete search history.

(56) References Cited

U.S. PATENT DOCUMENTS

| | | | |
|---|---|---|---|
| 6,351,340 | B2 | 2/2002 | Dixon |
| 6,906,880 | B1 | 6/2005 | Codilian |
| 7,372,656 | B2 | 5/2008 | Satoh et al. |
| 7,843,662 | B1 | 11/2010 | Weerasooriya et al. |
| 2001/0030824 | A1 | 10/2001 | Dixon |
| 2006/0232888 | A1 | 10/2006 | Satoh et al. |
| 2007/0268619 | A1 | 11/2007 | Smith et al. |
| 2010/0265613 | A1 | 10/2010 | Kim et al. |

*Primary Examiner* — Paul Huber (57) ABSTRACT

A disk drive is disclosed comprising a first head actuated over a first disk surface comprising servo information, a second head actuated over a second disk surface, and a voice coil motor (VCM) operable to actuate the first and second heads radially over the respective disk surfaces. The first disk surface and the second disk surface are rotated, and the servo information is read from the first disk surface using the first head to generate a read signal. The read signal is processed to generate a control signal applied to the VCM to move the second head radially over the second disk surface while applying an erase signal to the second head in order to erase at least part of the second disk surface.

20 Claims, 6 Drawing Sheets

DISK DRIVE SERVOING ON FIRST DISK SURFACE WHILE ERASING SECOND DISK SURFACE

CROSS REFERENCE TO RELATED APPLICATION

This application claims priority to U.S. Application No. 61/705,506, filed Sep. 25, 2012, for "DISK DRIVE SERVOING ON FIRST DISK SURFACE WHILE ERASING SECOND DISK SURFACE", which is incorporated herein by reference.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
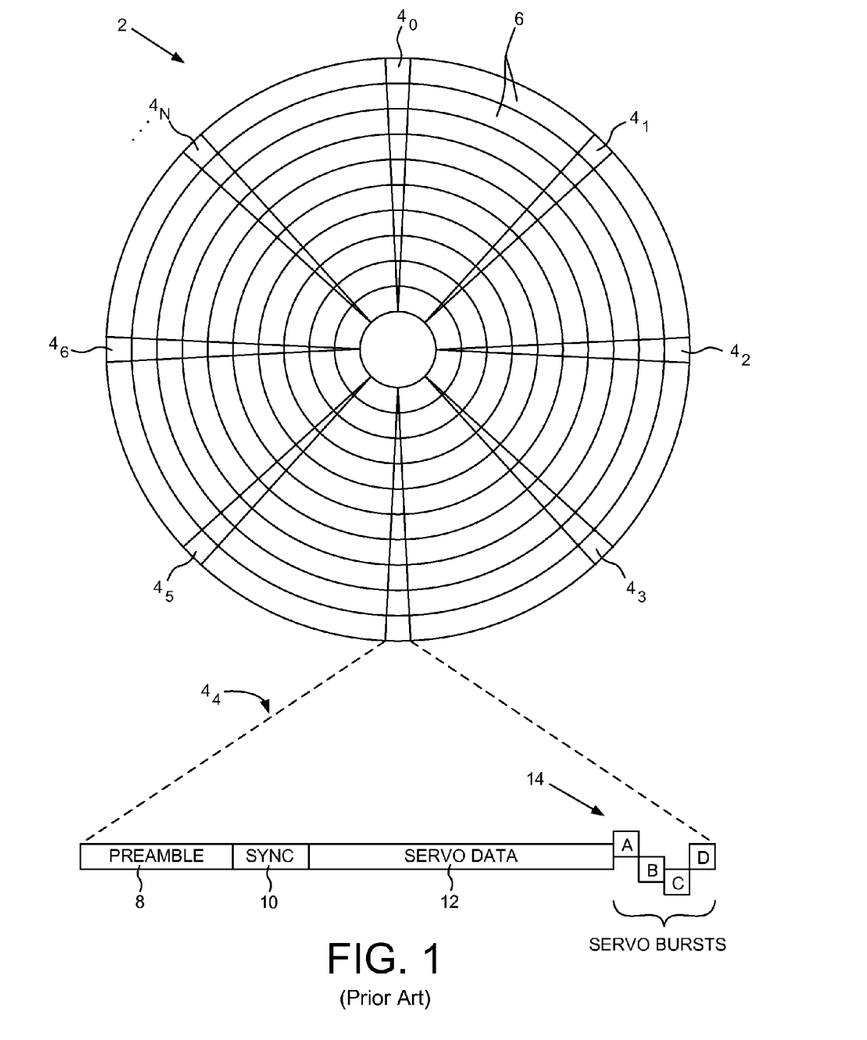
FIG. 1 shows a prior art disk format comprising a plurality of servo tracks defined by servo sectors.

FIG. 1 shows a prior art disk format 2 as comprising a number of servo tracks 6 defined by servo sectors $4_0$-$4_N$ recorded around the circumference of each servo track. Each servo sector $4_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $4_i$ further comprises groups of servo bursts 14 (A, B, C, D in the example shown), which are recorded with precise intervals and offsets relative to the servo track centerlines. The servo bursts 14 provide fine head position information used for centerline tracking while accessing a data track during write/read operations.

DETAILED DESCRIPTION

Figure 2A:
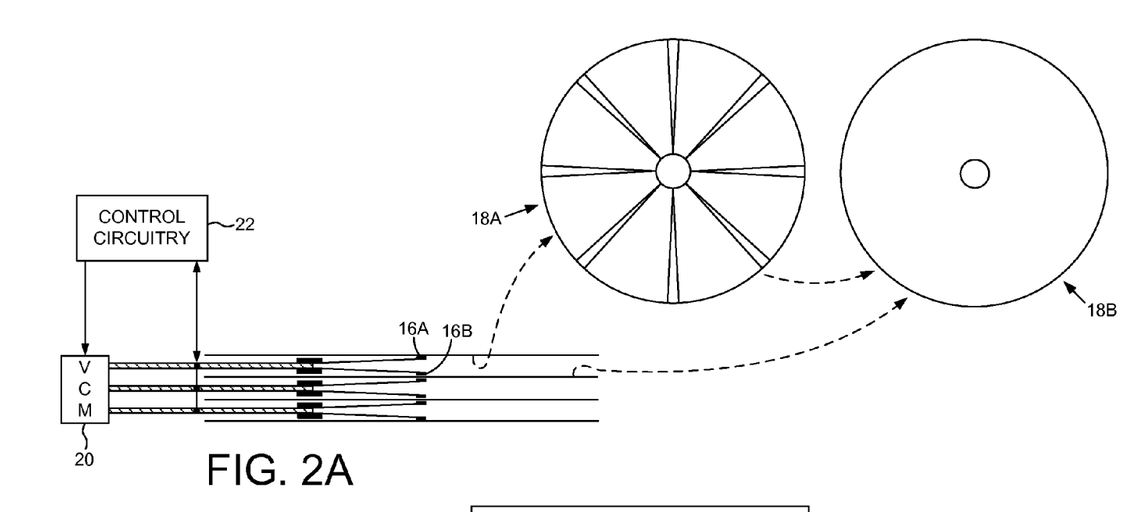
FIG. 2A shows a disk drive according to an embodiment of the present invention comprising a first head actuated over a first disk surface comprising servo information, a second head actuated over a second disk surface, and a voice coil motor (VCM) operable to actuate the first and second heads radially over the respective disk surfaces.
Figure 2B:
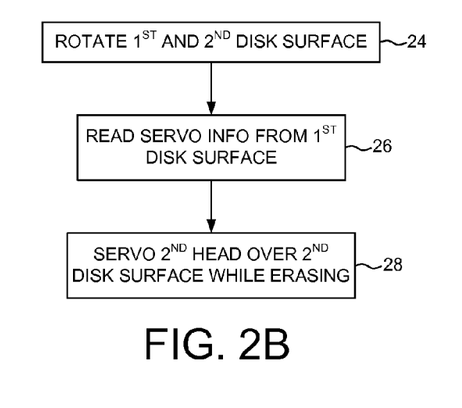
FIG. 2B is a flow diagram according to an embodiment of the present invention wherein while servoing the first head in response to the servo information on the first disk surface the second head is used to erase the second disk surface.

FIG. 2A shows a disk drive according to an embodiment of the present invention comprising a first head 16A actuated over a first disk surface 18A comprising servo information, a second head 16B actuated over a second disk surface 18B, and a voice coil motor (VCM) 20 operable to actuate the first and second heads 16A and 16B radially over the respective disk surfaces. The disk drive further comprises control circuitry 22 operable to execute the flow diagram of FIG. 2B, wherein the first disk surface and the second disk surface are rotated (block 24), and the servo information is read from the first disk surface using the first head to generate a read signal (block 26). The read signal is processed to generate a control signal applied to the VCM to move the second head radially over the second disk surface while applying an erase signal to the second head in order to erase at least part of the second disk surface (block 28).

In the embodiment shown in FIG. 2A, the servo information recorded on the first disk surface 18A comprises a plurality of concentric servo sectors extending across substantially an entire radius of the first disk surface 18A (similar to the prior art servo sectors $4_0$-$4_N$ shown in FIG. 1). Each concentric servo sector may comprise coarse positioning information such as a track address, and fine positioning information such as servo bursts recorded using any suitable pattern such as the amplitude based pattern shown in FIG. 1 or a suitable phase based pattern. The concentric servo sectors may be recorded on the disk in any suitable manner, such as using an external media writer or stamper for writing/stamping the concentric servo sectors onto the first disk surface 18A prior to inserting the disk into the disk drive. Another embodiment may employ an external servo writer for writing the concentric servo sectors on the first disk surface 18A after inserting the disk into the disk drive. Other embodiments may employ a self-servo writing technique wherein the control circuitry internal to the disk drive is used to write the concentric servo sectors to the first disk surface 18A. In yet other embodiments, the servo information recorded on the first disk surface 18A may be something other than concentric servo sectors, such as a plurality of spiral servo tracks examples of which are described below.

In one embodiment, the servo information recorded on the first disk surface 18A is read using the first head 16A while concurrently applying the erase signal to the second head 16B in order erase part of the second disk surface 18B. This concurrent read/write operation enables the second disk surface 18B to be erased completely, thereby avoiding gaps of unerased area were the read/write operations interleaved. Any suitable erase signal may be applied to the second head 16B in order to erase the second disk surface 18B, such as a DC erase signal wherein the write current is maintained at a constant level, or an AC erase signal wherein the write current is alternated at a suitable frequency.

Figure 3A:
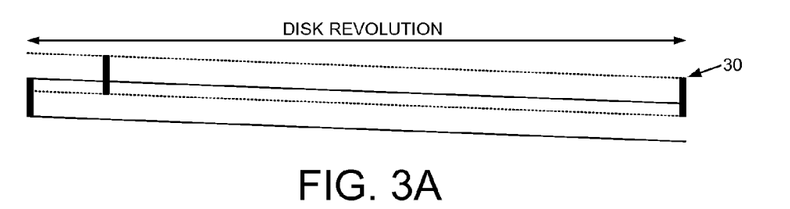
FIG. 3A shows an embodiment of the present invention wherein when erasing the second disk surface the write element is moved less than the width of the write element over a single revolution of the second disk surface.

FIG. 3A shows an embodiment of the present invention wherein the second head 16B comprises a write element 30 that spans a radial segment of the second disk surface 18B. The control circuitry 22 is operable to move the second head 16B radially over the second disk surface 18B such that the write element 30 moves less than the radial segment over a single revolution of the second disk surface 18B. This ensures the write element 30 traverses the second disk surface 18B along overlapping paths as illustrated in FIG. 3A so that the second disk surface 18B may be erased while moving the second head 16B over the radial segment (and in one embodiment over the entire radius of the second disk surface) one time. That is, the second head 16B is moved at a slow enough velocity to ensure the write element 30 does not move faster than its width over each disk revolution, thereby erasing the second disk surface 18B by performing a single seek radially over the second disk surface 18B (as opposed to performing multiple seeks).

Figure 3B:
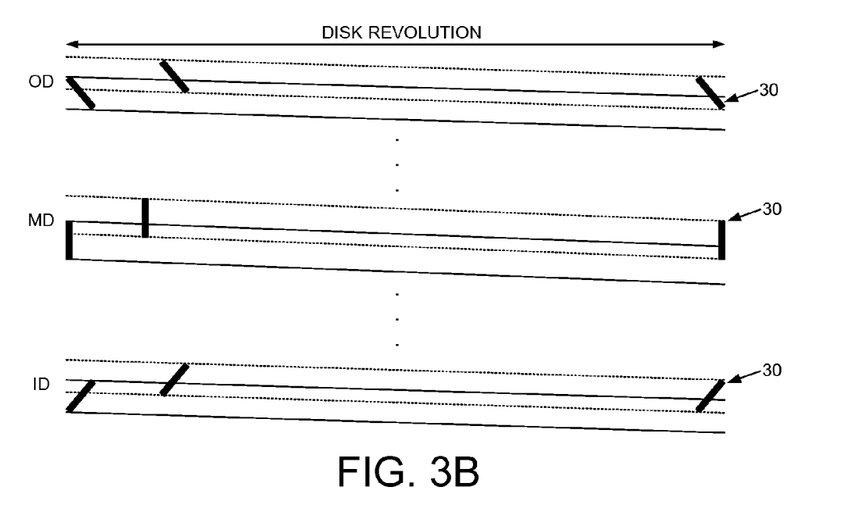
FIGS. 3B and 3C illustrate an embodiment of the present invention wherein the second head is moved at a first velocity near an outer diameter of the second disk surface, and moved at a second, different velocity near a middle diameter of the second disk surface.
Figure 3C:
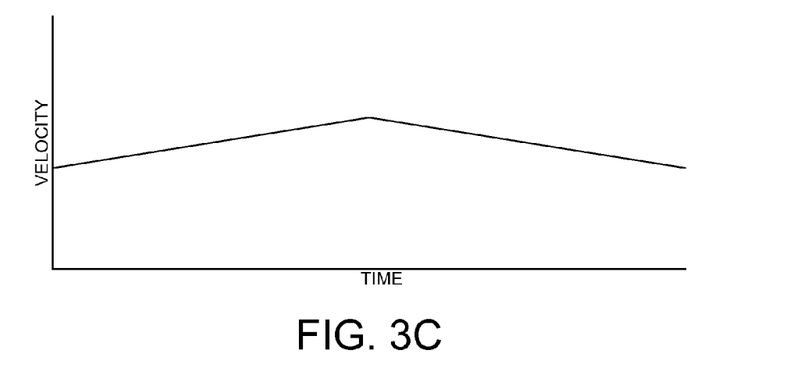

FIG. 3B shows an embodiment of the present invention wherein the radial segment of the second disk surface 18B spanned by the write element 30 of the second head 16B changes based on the radial location of the second head 16B due to the skew angle of the write element 30. In the example shown in FIG. 3B, the second head 16B comprises a rectangular shape such that the width of the write element 30 relative to the second disk surface 18B is wider near the middle diameter and narrower near the outer and inner diameters. In one embodiment, when the second head 16B is near the outer and inner diameter of the second disk surface 18B, the write element 30 is moved at a different velocity as compared to the middle diameter due to the change in the width of the write element 30 relative to the second disk surface 18B. In the example velocity profile shown in FIG. 3C, the velocity of the second head 16B is increased toward the middle diameter since the width of the write element 30 relative to the second disk surface 18B is increasing, thereby enabling a longer radial displacement over a single disk revolution near the middle diameter while still traversing paths that overlap as shown in FIG. 3B.

In another embodiment, the geometry of the second head 16B may cause the width of the write element 30 to be wider toward the outer and inner diameter of the second disk surface 18B. For example, in one embodiment the write element 30 may comprise a square or trapezoidal shape such that its width may increase near the outer and inner diameter due to the skew angle of the second head 16B. In this embodiment, the second head 16B may be moved faster near the outer and middle diameter of the second disk surface 18B (i.e., the velocity profile shown in FIG. 3C may be inverted).

Figure 4A:
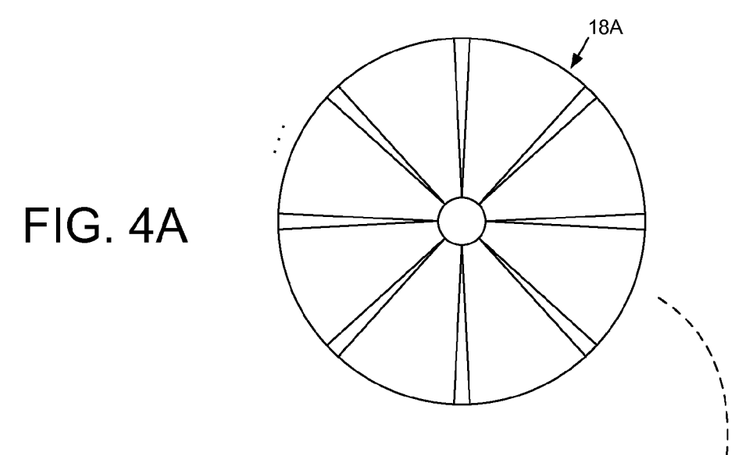
FIGS. 4A-4C show an embodiment of the present invention wherein spiral servo tracks are written on the second disk surface while servoing off of the first disk surface, and then the spiral servo tracks are erased from the second disk surface while servoing off of the first disk surface.
Figure 4B:
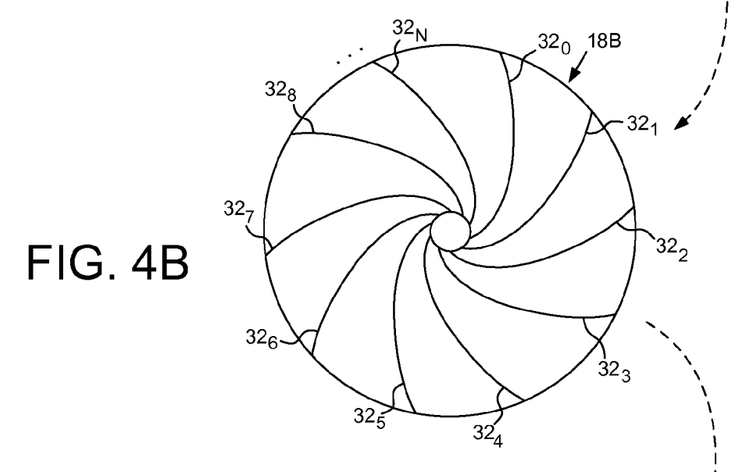
Figure 4C:
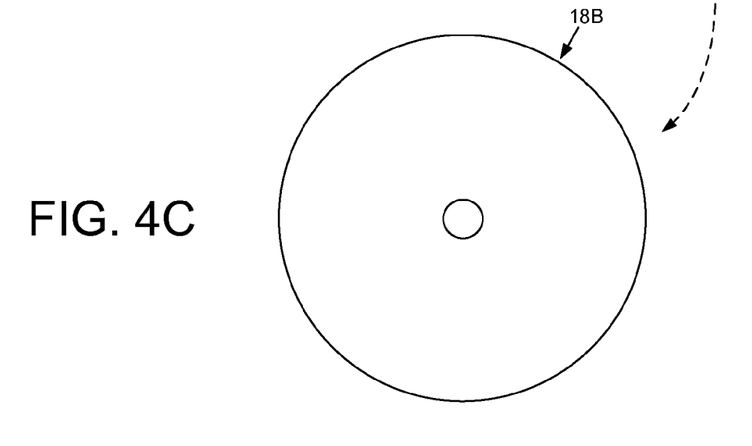
Figure 4D:
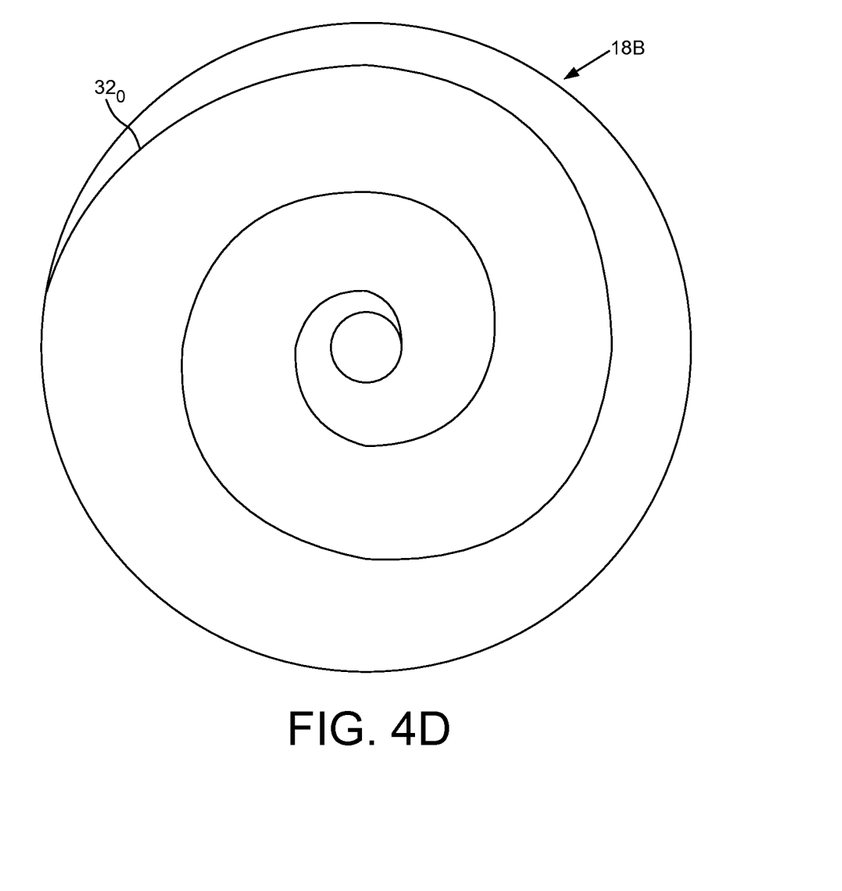
FIG. 4D shows an embodiment of the present invention wherein each spiral servo track spans multiple disk revolutions.

FIGS. 4A-4C show an embodiment of the present invention wherein spiral servo tracks $32_0$-$32_N$ are written on the second disk surface 18B while servoing off of the first disk surface 18A, and then the spiral servo tracks $32_0$-$32_N$ are erased from the second disk surface 18B while servoing off of the first disk surface 18A. Each spiral servo track 32 may be written in any suitable manner, wherein in one embodiment each spiral servo track 32 comprises a high frequency signal interrupted at a periodic interval by a sync mark. In the embodiment shown in FIG. 4B, each spiral servo track 32 spans a partial disk revolution (by moving the second head 16B at a corresponding radial velocity), whereas in another embodiment shown in FIG. 4D, each spiral track 32 may span multiple disk revolutions (by reducing the radial velocity while writing the spiral servo tracks).

In one embodiment, when writing a spiral servo track 32 to the second disk surface 18B the second head 16B is moved at a radial velocity that causes the write element 30 to traverse a radial segment that is wider than the write element 30 over a single revolution. For example, while writing each spiral servo track 32 the write element 30 may traverse a radial segment that is at least twice the width of the write element 30 over a single revolution, whereas when erasing the second disk surface 18B, the write element 30 may traverse a radial segment that is less than the width of the write element to ensure the write element 30 traverses overlapping paths as shown in FIG. 3A.

In one embodiment, after writing the spiral servo tracks $32_0$-$32_N$ to the second disk surface 18B, the control circuitry 22 servoes the second head 16B over the second disk surface 18B in response to the spiral tracks $32_0$-$32_N$ in order to write concentric servo sectors to the second disk surface 18B. If during the spiral servo track writing process an error occurs, it may be desirable to erase the previously written servo tracks from the second disk surface 18B so that the spiral servo track writing process can be restarted. That is, in one embodiment it is desirable to ensure the second disk surface 18B is completely erased before starting (or restarting) the spiral servo track writing process so as to minimize interference from aberrations on the disk surface while servo writing the concentric servo sectors.

Figure 5:
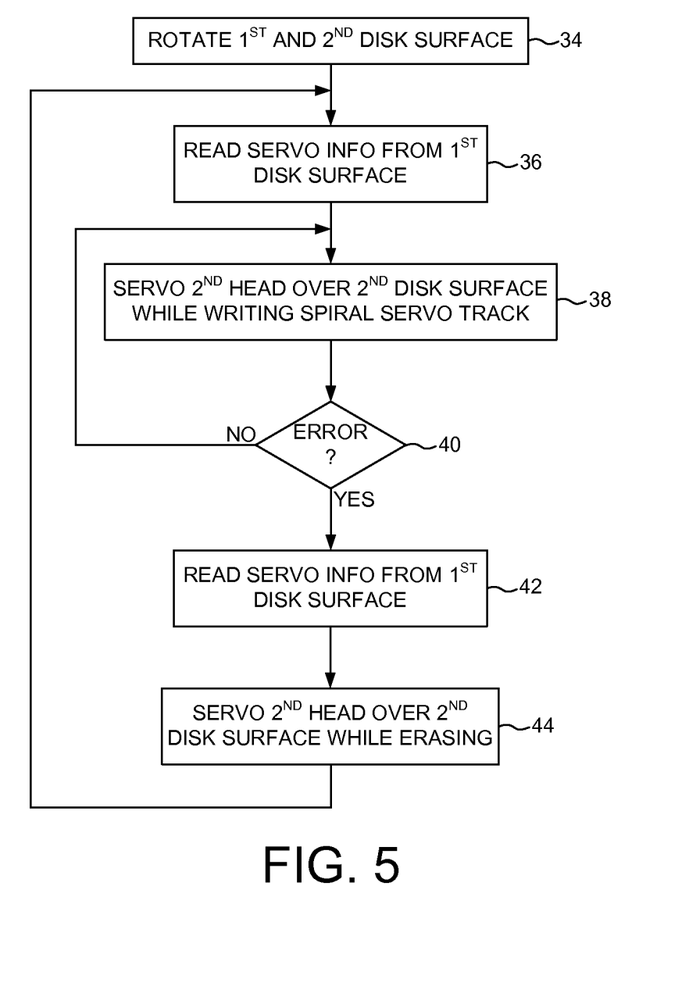
FIG. 5 is a flow diagram according to an embodiment of the present invention wherein when an error occurs while writing spiral servo tracks to the second disk surface, the spiral track write operation is aborted and the second disk surface is erased by servoing off of the first disk surface.

FIG. 5 is a flow diagram illustrating the above-described embodiment wherein the first and second disk surfaces 18A and 18B are rotated (block 34) and the servo information is read from the first disk surface using the first head to generate a read signal (block 36). The read signal is processed to generate a control signal applied to the VCM to move the second head radially over the second disk surface while writing a spiral servo track to the second disk surface (block 38). This process is repeated to write additional spiral servo tracks to the second disk surface. If an error occurs while writing the spiral servo tracks to the second disk surface (block 40), the servo information is read from the first disk surface using the first head to generate a read signal (block 42), and the read signal is processed to generate a control signal applied to the VCM to move the second head radially over the second disk surface while applying an erase signal to the second head in order to erase at least part of the second disk surface (block 44). After erasing the previously written spiral servo tracks, the flow diagram is repeated starting from block 36 in order repeat the spiral servo track writing procedure.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
    a first disk surface comprising servo information;
    a first head actuated over the first disk surface;
    a second disk surface;
    a second head actuated over the second disk surface;
    a voice coil motor (VCM) operable to actuate the first and second heads radially over the respective disk surfaces; and
    control circuitry operable to:
        rotate the first disk surface and the second disk surface;
        read the servo information from the first disk surface using the first head to generate a read signal; and
        process the read signal to generate a control signal applied to the VCM to move the second head radially over the second disk surface while applying an erase signal to the second head in order to erase at least part of the second disk surface,
    wherein:
        the second head comprises a write element that spans a radial segment of the second disk surface;
        the control circuitry is operable to move the second head radially over the second disk surface such that the write element moves less than the radial segment over a single revolution of the second disk surface; and
        the radial segment changes toward a middle diameter of the second disk surface.

2. The disk drive as recited in claim 1, wherein the servo information comprises a plurality of concentric servo sectors extending across substantially an entire radius of the first disk surface.

3. The disk drive as recited in claim 1, wherein the control circuitry is operable to concurrently read the servo information from the first disk surface and apply the erase signal to the second head in order erase part of the second disk surface.

4. The disk drive as recited in claim 1, wherein the erase signal comprises a direct current (DC) signal.

5. The disk drive as recited in claim 1, wherein the erase signal comprises an alternating current (AC) signal.

6. The disk drive as recited in claim 1, wherein the control circuitry is operable to:
    move the second head radially over the second disk surface near an outer diameter at a first velocity; and
    move the second head radially over the second disk surface near a middle diameter at a second velocity different than the first velocity.

7. The disk drive as recited in claim 1, wherein the control circuitry is operable to erase a radial section of the second disk surface by moving the second head over the radial segment one time.

8. The disk drive as recited in claim 1, wherein prior to erasing at least part of the second disk surface the control circuitry is operable to:
    move the second head radially over the second disk surface while writing a spiral servo track on the second disk surface; and
    after writing at least part of the spiral servo track on the second disk surface, move the second head radially over the second disk surface while applying the erase signal to the second head in order to erase at least part of the spiral servo track.

9. The disk drive as recited in claim 8, wherein:
    the second head comprises a write element that spans a radial segment of the second disk surface; and
    the control circuitry is operable to move the second head radially over the second disk surface such that the write element moves more than twice the radial segment over a single revolution of the second disk surface while writing the spiral servo track.

10. The disk drive as recited in claim 9, wherein after writing at least part of the spiral servo track on the second disk surface, the control circuitry is operable to move the second head radially over the second disk surface such that the write element moves less than the radial segment over a single revolution of the second disk surface while erasing at least part of the spiral servo track.

11. A method of operating a disk drive, the disk drive comprising a first head actuated over a first disk surface comprising servo information, a second head actuated over a second disk surface, and a voice coil motor (VCM) operable to actuate the first and second heads radially over the respective disk surfaces, the method comprising:
    rotating the first disk surface and the second disk surface;
    reading the servo information from the first disk surface using the first head to generate a read signal; and
    processing the read signal to generate a control signal applied to the VCM to move the second head radially over the second disk surface while applying an erase signal to the second head in order to erase at least part of the second disk surface,
    wherein:
        the second head comprises a write element that spans a radial segment of the second disk surface;
        the method further comprises moving the second head radially over the second disk surface such that the write element moves less than the radial segment over a single revolution of the second disk surface; and
        the radial segment changes toward a middle diameter of the second disk surface.

12. The method as recited in claim 11, wherein the servo information comprises a plurality of concentric servo sectors extending across substantially an entire radius of the first disk surface.

13. The method as recited in claim 11, further comprising concurrently reading the servo information from the first disk surface and apply the erase signal to the second head in order erase part of the second disk surface.

14. The method as recited in claim 11, wherein the erase signal comprises a direct current (DC) signal.

15. The method as recited in claim 11, wherein the erase signal comprises an alternating current (AC) signal.

16. The method as recited in claim 11, further comprising:
    moving the second head radially over the second disk surface near an outer diameter at a first velocity; and
    moving the second head radially over the second disk surface near a middle diameter at a second velocity different than the first velocity.

17. The method as recited in claim 11, further comprising erasing a radial section of the second disk surface by moving the second head over the radial segment one time.

18. The method as recited in claim 11, wherein prior to erasing at least part of the second disk surface the method further comprises:
    moving the second head radially over the second disk surface while writing a spiral servo track on the second disk surface; and
    after writing at least part of the spiral servo track on the second disk surface, moving the second head radially over the second disk surface while applying the erase signal to the second head in order to erase at least part of the spiral servo track.

19. The method as recited in claim 18, wherein:
- the second head comprises a write element that spans a radial segment of the second disk surface; and
- the method further comprises moving the second head radially over the second disk surface such that the write element moves more than twice the radial segment over a single revolution of the second disk surface while writing the spiral servo track.

20. The method as recited in claim 19, wherein after writing at least part of the spiral servo track on the second disk surface, further comprising moving the second head radially over the second disk surface such that the write element moves less than the radial segment over a single revolution of the second disk surface while erasing at least part of the spiral servo track.

* * * * *